United States Patent [19]

Kaufmann et al.

[11] 4,340,277
[45] Jul. 20, 1982

[54] LIQUID CRYSTAL DISPLAY AND METHOD OF MAKING

[75] Inventors: Meinolph Kaufmann, Fislisbach, Switzerland; Allan R. Kmetz, Chathan, N.J.

[73] Assignee: BBC Brown, Boveri, & Company, Limited, Baden, Switzerland

[21] Appl. No.: 72,997

[22] Filed: Sep. 6, 1979

[30] Foreign Application Priority Data

Dec. 12, 1978 [CH] Switzerland ............... 12626/78

[51] Int. Cl.³ ............................................. G02F 1/133
[52] U.S. Cl. ................... 350/347 E; 350/334; 350/337; 350/338
[58] Field of Search .............. 350/338, 347 E, 334, 350/337

[56] References Cited

U.S. PATENT DOCUMENTS 3,837,729  9/1974  Harsch ..................... 350/338
4,217,035  8/1980  Doriguzzi et al. ............ 350/338

*Primary Examiner*—Edward S. Bauer
*Attorney, Agent, or Firm*—Oblon, Fisher, Spivak, McClelland & Maier

[57] ABSTRACT

A liquid crystal display including a cell which consists of two cell plates and a liquid crystal with positive dielectric anisotropy layered between the plates, where the molecules of the liquid crystal next to the plates exhibit preferred directions rotated by 90°. The display includes only one polarizer that is placed on the front cell plate. A reflector formed of a layer of insulated metal particles is located inside the cell on the rear plate and exhibits a structure determining the preferred direction of the liquid crystal molecules. The electrode segments are holohedral and the operating voltage applied thereto lies between 1.3 and 2.5 times the Freedricksz threshold voltage.

2 Claims, 5 Drawing Figures

LIQUID CRYSTAL DISPLAY AND METHOD OF MAKING

BACKGROUND OF THE INVENTION

1. Field of the Invention

This invention relates to a liquid crystal display including a cell consisting of front and rear plane-parallel plates provided with electrode films on their inner surfaces, wherein at least the film on the front plate is transparent and segmented, and a liquid crystal of positive dielectric anisotropy is disposed inside the cell, the molecules of which exhibit preferred directions at the two inner surfaces of the cell plates, which directions are rotated by about 90° to one another, and wherein a polarizer is provided at the front but not the rear plate and a reflector is provided at the rear cell plate.

2. Description of the Prior Art

Such a liquid crystal display is known from DE-OS No. 24 22 509. There a display is described in which—in contrast to the usual twisted neumatic display—only one polarizer is needed. According to DE-OS No. 24 22 509 this is made possible by the use of obliquely incident light, which must reach the reflector via selected zones of the liquid crystal layer. The contrast is effected only by those rays which, on the one hand, reach the reflector through zones of the liquid crystal layer not lying between electrodes and, on the other hand, are reflected through zones bounded on both sides by electrodes. With this method a contrast can be produced only at the edges of the individual segments of the electrode patterns. Therefore the electrode patterns must be divided into a multiplicity of small interconnected electrode stripes in order to increase the number of edges. This, however, raises the photolithographic cost in manufacture and reduces the readability of the display.

Another attempt to eliminate the second polarizer in twisted neumatic displays is known from DE-OS No. 24 32 601. In this publication there is used for this purpose a polarizing reflector which, however, is made up of a quater-wave plate, an additionally required cholesteric liquid crystal layer and an absorption layer. But by these many additionally required elements the production cost is significantly increased.

Finally there is also known from DE-OS No. 24 32 601 a twisted nematic display not having a rear polarizer. Together with a quarter-wave plate needed as an additional element, this approach calls for a departure from the 90° twist of the cell to one of only 45°. Apart from the fact that here again no element can be dispensed with, the 45° twist generally has in the finished cell a weaker contrast between the on and off states as a consequence.

SUMMARY OF THE INVENTION

Accordingly, one object of this invention is to provide a novel reflecting liquid crystal display which exhibits an increased brightness compared with the twisted nematic displays known heretofore.

Another object is to provide such a display as noted above, which is able to display undistorted and pinpoint-sharp symbols, where these symbols can be exhibited over the entire area of the desired electrode segments.

Yet a further object is to provide a reflecting liquid crystal display which is simpler and cheaper to produce, and permits employment of an opaque rear plate.

These and other objects are achieved by providing a novel liquid crystal display including a cell formed by front and rear plane parallel plates having electrode films formed on the inner surfaces thereof, at least the front plate having a transparent and segmented film, wherein a polarizer is provided at the front plate but not at the rear plate, the cell having a reflector at the rear plate and wherein a liquid crystal of positive dielectric anistropy is disposed within the cell between the plates, the liquid crystal molecules exhibit preferred directions at the inner surfaces of the front and rear plates, with the preferred directions rotated by about 90° to one another. The display is further characterized by the reflector being disposed on the inner side of the rear cell plate inside the cell, and exhibiting a structure determining the preferred direction of the neighboring liquid crystal molecules. Additionally, the electrode segments are holohedral, i.e. not subdivided, and the magnitude of the operating voltage (V) applied thereto lies between 1.3 and 2.5 times, preferably 1.3 to 1.9 times, the Freedericksz threshold voltage ($V_{th}$).

A first important advantage of the invention is that, on the one hand, the rear polarizer can be omitted. The display background thereby becomes brighter, by just the amount which would be lost, if the light had to pass twice through the rear polarizer. On the other hand, in the present invention the full area of any desired electrode segments can be made to display. These two facts together account for the outstanding contrast of the display of the invention. The readability is increased even more because in the present invention the reflector can be situated in the cell interior. This makes it possible to locate the rear preferred direction, orienting the liquid crystal molecules, on the reflector itself, so that reflection and orientation take place on one and the same plane, which results in distortion-free and pinpoint-sharp images.

By the elimination of the rear polarizer and the location of the reflector in the cell interior, there are offered the further advantages that the cost of fabrication and assembly of two elements outside the cell can be saved and the susceptibility to external damage can be reduced.

A further advantage realized by locating the reflector inside the cell is that transparent electrodes need no longer be used on the rear plate. Rather, the present invention permits the utilization of metallic conductors as electrodes on the rear plate. Thus, owing to the much better conductivity of these metallic rear electrodes, undesirable voltage drops along thin and long conducting paths can be avoided. Precisely in a multiplex drive, for which the liquid crystal display of the invention is particularly suited on account of the voltage region appropriate here and provided by the invention, such voltage drops are unacceptable. Since in the present invention transparency of the rear plate is no longer necessary, any other cheaper and more suitable material can be chosen for it. Likewise, the thickness of the plate can be freely chosen according to given circumstances.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
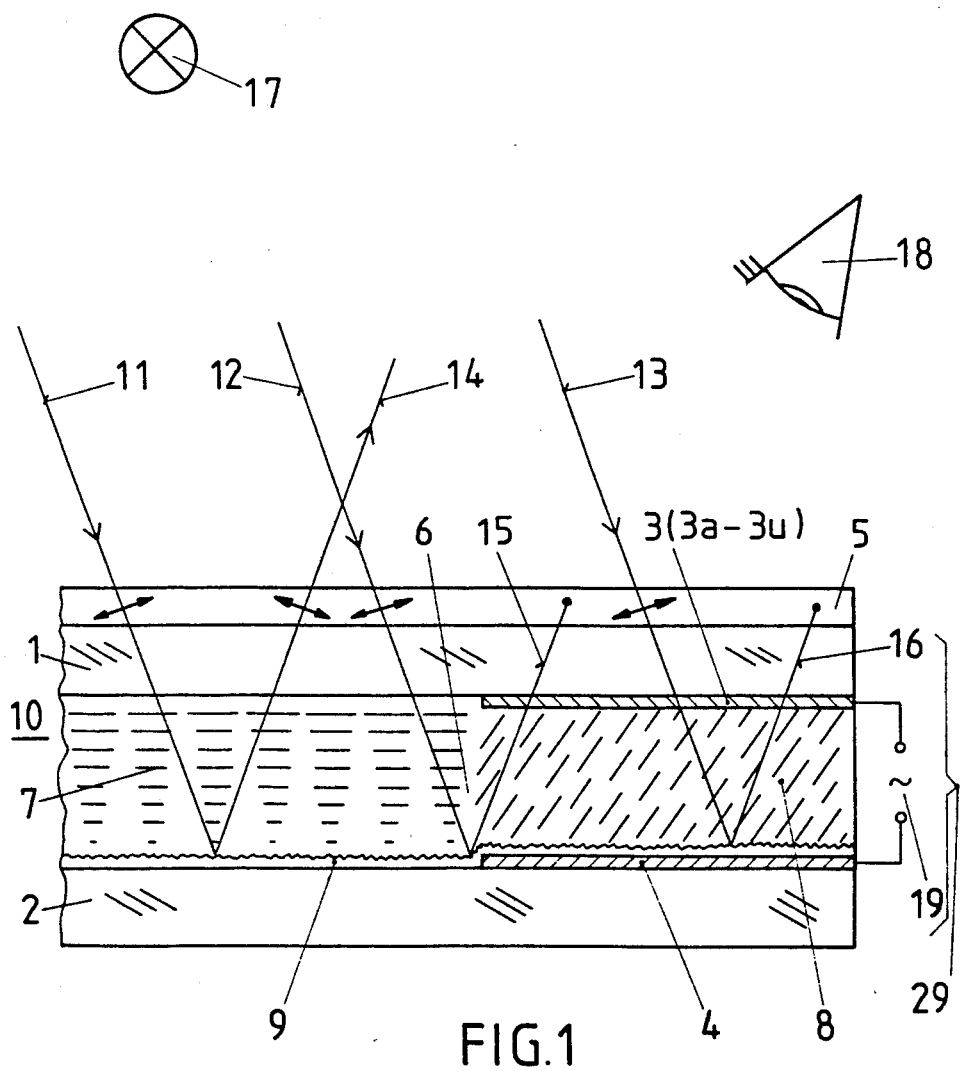
FIG. 1 is a schematic cross-sectional view through one possible embodiment of the liquid crystal display of the invention.
Figure 2:
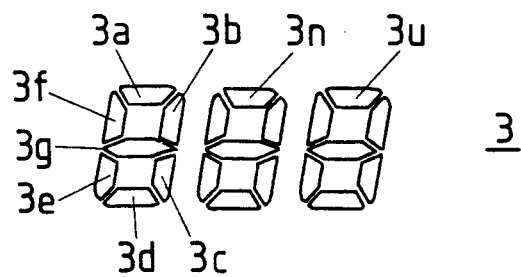
FIG. 2 is a plan view of a possible configuration of the front electrode segments in the case of a liquid crystal display according to the invention with, for example, a three-digit display.

Referring now to the drawings, wherein like reference numerals designate identical or corresponding parts throughout the several views, and more particularly to FIG. 1 thereof, there is schematically illustrated a liquid crystal display 10 according to the invention, which includes two cell plates 1, 2, which together with the liquid crystal 6 between these plates form the cell 29. The front, transparent plate 1 is provided with a linear polarizer 5 on the side towards the light source 17 and observer 18. On the side of the plate 1 towards the nematic liquid crystal 6 is applied a transparent, conductive coating as a front electrode 3, which in general, as shown in FIG. 2, consists of separate, individually controllable electrode segments 3a–3u, but which is shown in FIG. 1 as consisting of a single, conductive coating for the sake of simplicity. The liquid crystal 6 is a nematic liquid crystal with positive dielectric anisotropy. The surface of the plate 1 next to the liquid crystal 6 together with the front electrode 3 is given a structure, produced e.g. by rubbing, orienting the liquid crystal molecules in a preferred direction. In the example chosen in FIG. 1, this preferred direction runs along the front plate 1 parallel to the symbol plane. The liquid crystal display 10 further includes a second, not necessarily transparent rear plate 2, which is arranged to be parallel to the front plate 1 with a slight separation, about 2.5 μm to 0.025 mm therebetween. The rear plate 2 is provided with a rear electrode 4 likewise represented as a conductive film on the surface next to the liquid crystal 6. The rear electrode too, if necessary, can be divided into several electrode segments not shown here. The rear plate 2, moreover, is provided on the side next to the liquid crystal 6 with a diffusely scattering reflector 9, which is likewise provided with a preferred direction, produced e.g. by rubbing, on the side next to the liquid crystal 6, which direction is turned by about 90° to that of the front plate 1 and electrode 3, and thus directed perpendicular to the symbol plane in FIG. 1. The plates 1, 2 are held around the edges by a mounting strip so as to hermetically enclose the liquid crystal 6 in the form of a cell. By means of the electrodes 3,4, the region therebetween containing the liquid crystal 6 can be placed under the influence of an electric field with the help of an AC voltage 19. In the field-free state 7 of the liquid crystal 6 its molecules align themselves in the preferred directions impressed on the plates 1, 2, thus twisted by about 90°. In the field-free state 7, therefore, the polarization plane of linearly polarized light in passing once through the liquid crystal 6 is rotated by about 90°. However, if a voltage is applied between the electrodesd 3,4, then, depending on the magnitude of the applied voltage the molecular structure of the liquid crystal in the left half of the figure, produced by the front and rear preferred directions, is largely destroyed and the deformed state 8 of the liquid crystal 6 thus caused by the electric field no longer enables the polarization plane of linearly polarized light to rotate in general. If, however, there is applied to the electrodes 3, 4 only a voltage lying not too far above the so-called Freedericksz threshold voltage $V_{th}$, and always $\leq 3\ V_{th}$, then the ability to rotate the polarization plane of light traversing the liquid crystal in certain directions to still retained, while for other directions no measurable influence on the polarization plane is observable any longer. For the definition of the Freedericksz threshold voltage $V_{th}$, reference is made to M. Schadt and W. Helfrich, Appl. Phys. Lett. 18 (1971) 127. According to them, $$V_{th} = \frac{\pi}{2}\sqrt{\frac{K_{11} + (K_{33} - 2K_{22})}{\epsilon_o \Delta\epsilon}}$$

in CGS units.

If now, in accordance with the basic idea of the present invention, there is applied to the electrodes 3, 4 only a voltage V, where $1.3\ V_{th} \leq v \leq 2.5\ V_{th}$, preferably $1.9\ V_{th}$, there then results the situation of the deformed state 8, indicated in FIG. 1 by the skewed liquid crystal molecules, which makes possible a display in the following manner proposed by the invention. Of the obliquely incident light from the source 17, FIG. 1 shows three characteristic rays 11, 12, 13. The incident ray 11 is linearly polarized by the polarizer 15 so that its polarization plane is parallel to the symbol plane of the passage through the polarizer 5. The field-free state 7 of the liquid crystal 6 now rotates this polarization plane through 90°, which rotation is nullified after reflection at reflector 9 on the reverse passage through the liquid crystal so that the light ray 14 can freely pass through the polarizer 5 and reach the eye of an observer 18. To the observer, then, the left part of the display in FIG. 1 appears bright. For the incident light ray 12 there holds what was said about light bundle 11. After reflection, however, it traverses the liquid crystal in a nearly parallel direction to the molecules. The liquid crystal, subjected only to the weak field influence provided for by the invention, is unable here to counterrotate the polarization plane for the direction of the reflected light ray 15, so that the light ray 15 cannot pass the polarizer 5. The observer 18 received no light from this part of the display 10, i.e. it appears dark to him. The incident ray 13 from the light source 17 is likewise polarized by the polarizer 5 with polarizaton plane parallel to the symbol plane. For the direction of the ray 13, however, the state of the liquid crystal 6 subjected to the weak field of the invention in the right part of display 10, has the same rotating action as the field-free state 7 of the liquid crystal 6 on the rays 11, 12 and 14. Consequently the light ray 13 experiences a rotation of its plane of polarization by 90° on its way to reflector 9, but on its return path as reflected ray 16 it is not transmitted by polarizer 5 on account of the absence of counterrotation of the polarization plane in this direction. But then the observer 18 sees the entire electrode surface 3 dark, and the appropriate electrode patterns, cf. FIG. 2, can be used for image display.

Figure 3:
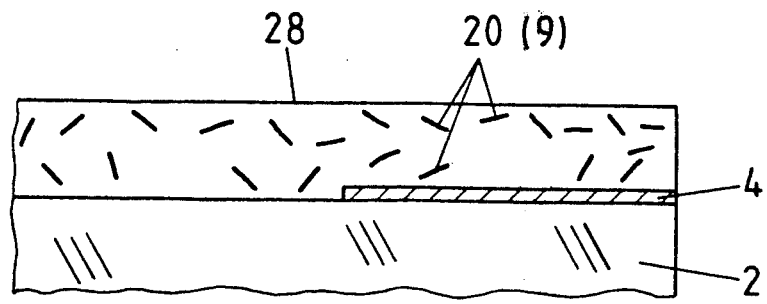
FIG. 3 is a schematic cross-sectional view at the moment of application of the reflector to the rear plate before heating.
Figure 4:
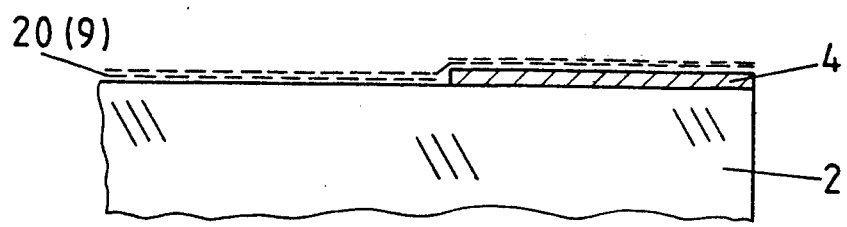
FIG. 4 is a schematic cross-sectional view of the reflector on the rear plate after the heating.
Figure 5:
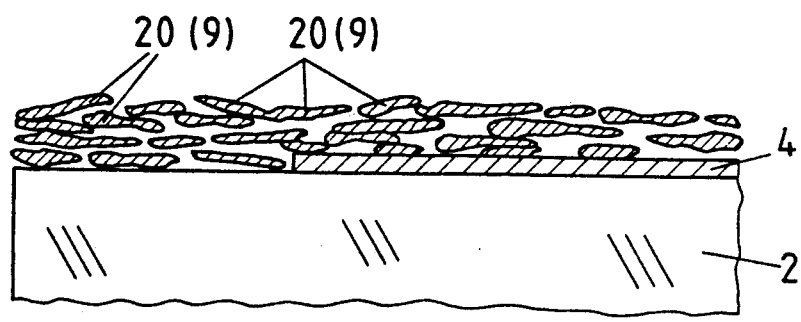
FIG. 5 is an enlarged representation of the reflector of the invention.

A preferred method of the invention for producing the reflector 9 consists of coating the rear electrode 4 and the rear plate 2 with diffusely reflecting metallic particles. This will be explained with the help of FIGS. 3, 4 and 5. FIGS. 3 and 4 show how the rear electrode 4 and the remaining free portion of the surface of plate 2 next to the liquid crystal layer are coated with mutually insulated metal particles 20, for instance aluminum. These metal particles 20 exhibit a conductivity of <10 $\mu$S per square in the lateral directions in the electrode surface and act as diffuse reflector 9. The individual metal particles 20 consisting of aluminum pigments, FIG. 5, are covered with a 10 to 100 Å thick oxide layer forming in normal atmosphere; although, as shown in FIGS. 4 and 5, the particles are tightly packed together, this oxide layer acts as insulator. There is, therefore, practically no conductivity in the lateral directions of the electrode surface. Because of the small particle separation, however, there is a very good capacitive coupling in a direction normal to the lateral directions of the electrode surface.

The production of this preferred example of embodiment of a reflector 9 can be accomplished very economically. First, the rear plate 2 is provided with the rear electrode 4. In a subsequent screen-press printing method the whole surface of the rear plate 2 later to be in the visible portion of the liquid crystal display 10, is passed with an aluminum-bronze coloring or coating. The insulated metal particles 20 are thus applied to the rear plate in the form of a viscous aluminum-bronze coloring with a proportion of 3-5 weight percent aluminum pigment in the binder 28. The aluminum-bronze coloring consists of a binder 28 (e.g. nitrocellulose in amylacetate mixed in the weight ratio of 1:1) and aluminum pigment particles with an average length of 2-10 $\mu$m. The mixing ratio by weight of binder 28 to aluminum pigment is 1:5 to 1:15. The thickness of the aluminum-bronze coloring layer varies with the concentration of aluminum pigment. In practice a thickness of the pressed aluminum-bronze coloring of 5 to 20 $\mu$m has proved suitable. Screens with more than 100 filaments per cm are good; the examples of embodiment were prepared using a screen (Estalmono 200 from the Swiss Seidengazefabrik, St. Gallen) with 200 filaments per cm. The coated plates are then heated to about 400° to 500° C. for about an hour. During this process the binder 28 is baked and evaporated without forming a residue, whereby the aluminum pigments shrink down to an overall thickness of 0.5 to 5 $\mu$m. The plates are now rubbed. After mounting of front plate 1 and the corresponding adjustment of plates 1 and 2 according to the form of electrodes 3 and 4, there follows in a soldering oven a glass soldering process known from rotation-cell manufacture.

An alternative production method is the spraying process. To this end the aluminum pigments of 2-18 $\mu$m length are mixed with a highly volatile and nonflammable solvent, such as, e.g. difluorodichloromethane (Freon TF by du Pont) in a high rotation rate mixer or ultrasonically. The weight percent of aluminum pigments in the binder is 1-20%, care being taken that mixing is uniform, i.e. no clumping of pigments is detectable. Such a mixture is now applied to the cleaned rear plate 2 by means of a spray gun under a pressure of 4-6 atm. abs. with a very fine nozzle. It has been found that in this method the solvent evaporates before it reaches the plate 2, so that a highly uniform reflector surface is obtained. In principle the reflector could immediately be used in a liquid crystal cell, but is still not resistant to wiping or scratching, so that a subsequent heat treatment at a temperature of 400°-500° C. and a duration of about 2 min. is recommended, whereby the reflector structure is thermally stabilized, so that the plate 2 is now largely abrasion-proof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a liquid crystal display including:
   providing a cell formed by front and rear plane parallel plates having electrode films formed on the inner surfaces thereof, at least the front plate having a transparent and segmented electrode film, wherein a polarizer is provided at the front plate but not at the rear plate, the cell having a reflector at the rear plate, wherein a liquid crystal of positive dielectric anistropy is disposed within the cell between the plates, the liquid crystal molecules exhibiting preferred directions at the inner surfaces of the front and rear plates, with the preferred directions rotated by about 90° to one another, the reflector being formed on the inner side surface of the rear cell plate between the front and rear cell plates and exhibiting a structure determining the preferred direction of the neighboring liquid crystals molecules, the front electrode segments being holohedral; and
   applying an operating voltage lying between 1.3 and 2.5 times the Freedericksz threshold voltage ($V_{th}$) across the electrodes formed on the front and rear cell plates such that the liquid crystal between the electrodes having the operating voltage applied thereacross retains an ability to rotate the polarization plane of light traversing the liquid crystal in some directions and has substantially no influence on light traversing the liquid crystal in other directions.

2. A method as in claim 1, further comprising:
   applying an operating voltage lying between 1.3 to 1.9 times the Freedericksz threshold voltage ($V_{th}$) across the electrodes formed on the front and rear cell plates.

* * * * *